United States Patent [19]

Carstens et al.

[11] Patent Number: 5,509,643
[45] Date of Patent: Apr. 23, 1996

[54] HYDRAULICALLY DAMPING BEARING BUSH

[75] Inventors: Udo Carstens, Pastetten; Mathias Gugsch, München, both of Germany

[73] Assignee: Metzeler Gimetall AG, Munich, Germany

[21] Appl. No.: 198,761

[22] Filed: Feb. 18, 1994

[51] Int. Cl.$^6$ ................................................ F16M 1/00
[52] U.S. Cl. ...................... 267/140.12; 267/140.11; 267/293; 248/562
[58] Field of Search .................. 188/269; 267/293, 267/140.12, 140.11, 140.2, 140.3, 141.6; 248/635, 636, 562

[56] References Cited

U.S. PATENT DOCUMENTS

| | | | |
|---|---|---|---|
| 2,856,035 | 10/1958 | Rohacs | 188/269 |
| 4,861,004 | 9/1989 | Yokota | 267/293 |
| 4,872,651 | 10/1989 | Thorn | 267/293 |
| 4,927,123 | 5/1990 | Schwerdt | 267/293 |
| 5,024,425 | 6/1991 | Schwerdt | 267/293 |
| 5,178,376 | 12/1993 | Hamaeqers | 267/140.12 |
| 5,280,885 | 1/1994 | Noguchi | 267/140.12 |

FOREIGN PATENT DOCUMENTS 0331916  9/1989  European Pat. Off. .

Primary Examiner—Robert J. Oberleitner
Assistant Examiner—C. T. Bartz
Attorney, Agent, or Firm—Herbert L. Lerner; Laurence A. Greenberg

[57] ABSTRACT

A hydraulically damping bearing bush, particularly for motor vehicles, includes a hollow-cylindrical bearing core having ends with end surfaces and an outer tube having end surfaces. Two elastomeric support springs have a space therebetween and are disposed between the bearing core and the outer tube at the end surfaces. The support springs extend substantially radially and have inwardly curved wall portions. Elastomeric radial support lugs extend horizontally on two sides between the bearing core and the outer tube. The support lugs divide the space into upper and lower fluid-filled chambers. The chambers communicate with one another through an annular channel. A cylindrical diaphragm-like elastomeric part extends between the two support springs along the bearing core. The elastomeric support springs, support lugs and part are made as an integral molded and vulcanized part. Radially extending, bead-like stop rings are disposed on the ends of the bearing core in the vicinity of the inwardly curving wall portions.

2 Claims, 1 Drawing Sheet

HYDRAULICALLY DAMPING BEARING BUSH

BACKGROUND OF THE INVENTION

Field of the Invention

The invention relates to a hydraulically damping bearing bush, particularly for motor vehicles, having a hollow-cylindrical bearing core, an outer tube, support springs of elastomeric material being disposed on the end surface between the bearing core and the outer tube, extending substantially radially and having an inwardly curved wall portion, and radial support lugs extending horizontally on both sides between the inner bush and the outer tube and dividing the space between the support springs into an upper and a lower fluid-filled chamber communicating with one another through an annular channel.

Such a bearing bush is known from Published European Application No. 0 331 916 A. However, that known bearing bush includes many individual parts, which have to be assembled at considerable effort. Moreover, that bearing bush has an inadequate course of stiffness, which is not soft enough particularly in the lower frequency range, while conversely an overly slight rise in stiffness occurs at high oscillation amplitudes. Moreover, a targeted stiffness characteristic curve cannot be achieved with such a structure of a bearing bush.

Summary of the Invention

It is accordingly an object of the invention to provide a hydraulically damping bearing bush, which overcomes the hereinafore-mentioned disadvantages of the heretofore-known devices of this general type, which can be produced very simply from a few parts and which moreover, while beginning with basic components, enables easy adaptation to various requirements in terms of damping and the course of stiffness.

With the foregoing and other objects in view there is provided, in accordance with the invention, a hydraulically damping bearing bush, particularly for motor vehicles, comprising a hollow-cylindrical bearing core having ends with end surfaces; an outer tube having end surfaces; two elastomeric support springs having a space therebetween, the support springs being disposed between the bearing core and the outer tube at the end surfaces, and the support springs extending substantially radially and having inwardly curved wall portions; elastomeric radial support lugs extending horizontally on two sides between the bearing core and the outer tube, the support lugs dividing the space into upper and lower fluid-filled chambers; an annular channel through which the chambers communicate with one another; a cylindrical diaphragm-like elastomeric part extending between the two support springs along the bearing core; the elastomeric support springs, support lugs and part being made as an integral molded and vulcanized part; and radially extending, bead-like stop rings being disposed on the ends of the bearing core in the vicinity of the inwardly curving wall portions.

A much simpler manufacture and assembly of a bearing bush of this kind is accordingly provided. Moreover, because of the stop rings and their variability, a predetermined influence on the course of stiffness is provided, since increased stiffness and therefore reduced deflection are desirable, especially at high amplitudes.

In accordance with another feature of the invention, there is provided, on the inside of the outer tube, a cylindrical sheath with a radial indentation in the middle being disposed between the two support springs and forming the annular overflow channel with the outer tube. This is done in order to provide easier variation of the damping behavior.

This makes it very easy to provide overflow channels of the most varied configurations, in one basic model.

In accordance with a further feature of the invention, the radial support lugs have a central, longitudinally extending hollow chamber, in order to compensate for thermal expansions or for tensile strains caused by shrinkage.

In accordance with an added feature of the invention, there is provided an additional channel in the form of a segment of a circle with a limited length and with reduced inlet and outlet openings, which extends between the support lugs and the outer tube, and a spherical or cylindrical mass of slightly smaller diameter than that of the channel being enclosed in the channel. This is done in order to make the engine mount as soft as possible, particularly in the region of the idling rpm.

In accordance with an additional feature of the invention, there is provided an absorber of elastomeric material with trapped gas bubbles, being disposed inside the two fluid chambers and being adjacent the overflow channel sheath. This provides a further option for compensating for thermal expansion.

In accordance with a concomitant feature of the invention, in the region of the diaphragm-like elastomer part, the inner bush has an annular indentation forming an air gap with the opposed elastomer part acting as a decoupling diaphragm. This enables the bearing to obtain a high degree of insulation at higher frequencies of low amplitude.

Other features which are considered as characteristic for the invention are set forth in the appended claims.

Although the invention is illustrated and described herein as embodied in a hydraulically damping bearing bush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
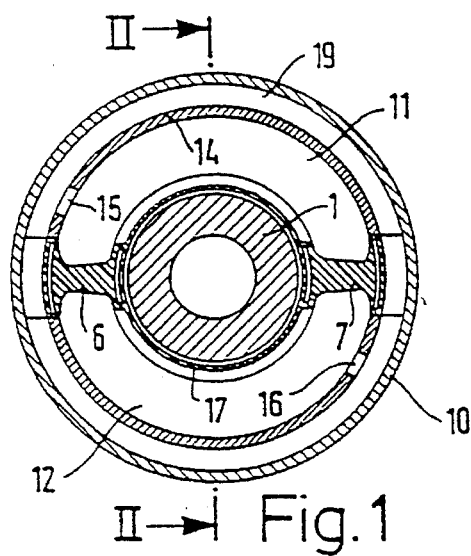
FIG. 1 is a diagrammatic, cross-sectional view of a bearing bush, taken along the line I—I of FIG. 2, in the direction of the arrows.
Figure 2:
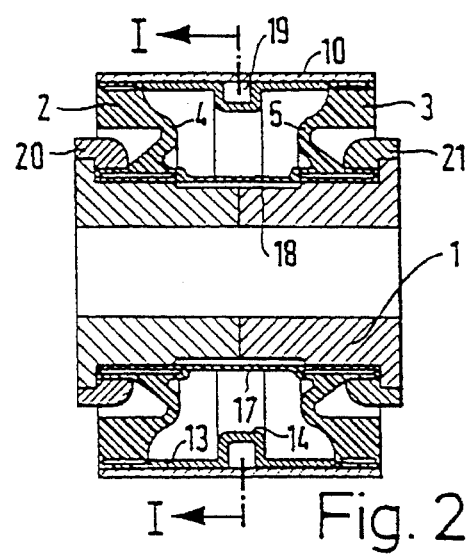
FIG. 2 is a longitudinal-sectional view of the bearing bush, taken along a line II—II of FIG. 1, in the direction of the arrows.

Referring now to the figures of the drawing in detail and first, particularly, to FIGS. 1 and 2 thereof, there is seen a hydraulically damping bearing bush or mount which has a hollow-cylindrical bearing core 1 of metal or plastic that may also be divided in the middle in the axial direction, as is shown in FIG. 2. Radially extending support springs 2 and 3 are formed onto two ends of the bearing core 1 and in the middle region of their radial extent they each have a respective inwardly curved wall part 4 and 5. Moreover, as is seen particularly from FIG. 1, radial support lugs 6 and 7 extend horizontally between the two support springs 2 and 3. An outer tube 10 is provided radially outwardly from the two support lugs 2 and 3, as an engagement point for a bearing support.

As a result, a space between the support springs 4 and 5 is divided by the two support lugs 6 and 7 into two chambers 11 and 12 above and below the support lugs 6 and 7. Both of the chambers 11, 12 are filled with a fluid. In addition, a cylindrical sheath 13 with a central indentation 14 is inserted between the two support springs 2 and 3 adjacent the outer tube 10. This sheath forms an overflow channel 19 between the two fluid chambers 11 and 12 through the use of respective radially oriented openings 15 and 16 in the upper chamber 11 and the lower chamber 12.

A diaphragm-like elastomer part 17 is additionally provided between the two support springs 2 and 3, in the region adjacent the bearing core. The elastomer part 17 defines an annular indentation 18 on the outer periphery of the bearing core 1, practically as a decoupling diaphragm.

An essential feature is that all of the elastomer parts, that is the two support springs 2 and 3, the support lugs 6 and 7 and the cylindrical elastomer part 17 are injection-molded as a cohesive integral part and vulcanized. This provision considerably simplifies assembly, for the finished bearing bush in particular.

As can also be seen from FIG. 2, radially extending, bead-like stop rings 20 and 21 are provided on the ends of the bearing core 1, in the region of the inwardly curved wall parts 4 and 5 of the support springs 2 and 3.

The mode of operation of this bearing bush is as follows.

Typically, a hydraulically damped bearing bush of this kind is used as a torque support for the engine of a motor vehicle. Bushes of this kind have the advantage of assuring abrasion-proof engine mounting.

As already noted, a fluid is located in the two chambers 11 and 12. As the bearing core 1 moves up and down, this fluid is pumped from one chamber or channel to another through the overflow channel 19. Upon each stroke, an overpressure accordingly is produced in the corresponding work chamber, and as a result, in comparison with single-action conventional hydraulic bearings, more work can be dissipated with an overpressure and a negative pressure phase in the work chamber.

In the event of lesser deflections, the bearing bush is very soft, especially from the construction of the support springs 2 and 3 with the indented wall portions 4 and 5. However, in the event of major deflections, the two stops 20 and 21 rapidly enter into engagement with the support springs 2 and 3, so that as a result the bearing becomes increasingly harder. The course of stiffness can be adjusted within wide limits by the geometrical construction and/or the material of these stops 20 and 21.

Through the use of a geometrical construction of the overflow channel 19, which is basically formed by the cylindrical sheath 13 with the middle indentation 14, the hydraulic behavior of the bearing bush, or in other words in particular the damping capacity at corresponding frequencies, can be varied and adjusted.

In order to keep the bearing acoustically soft even at high frequencies, or in other words to avert dynamic hardening, amplitude decoupling is provided, due to the fact that an air gap has been left free in the indentation 18 between the bearing core 1 and the elastomer part 17 acting as a decoupling diaphragm. This gap is formed by a corresponding indentation in the bearing core 1. At high frequencies, at which the overflow channel 19 is hydraulically closed, volumetric changes in the work chambers produced by low vibration amplitudes can therefore be absorbed in this air gap.

Figure 3:
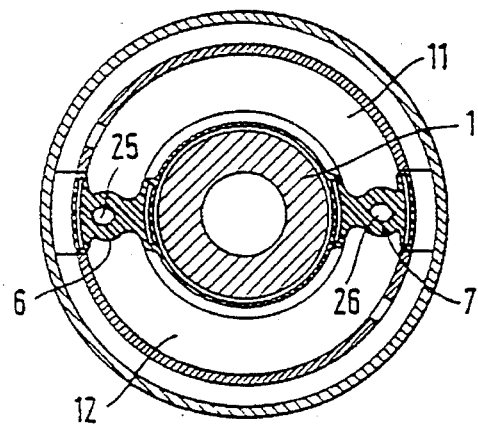
FIG. 3 is a cross-sectional view of a bearing bush with hollow chambers in support lugs.

Another essential feature in bearing bushes of this kind is that different thermal expansions can be compensated for, or tensile strains in the support lugs 6 and 7 caused by shrinkage can be averted or compensated for. In order to solve this problem, as is shown in the cross section of FIG. 3, the support lugs 6 and 7 are provided with central, longitudinally extending hollow chambers 25 and 26. Elongation of the support lugs 6 and 7 in the radial direction is therefore possible, without any need to fear premature rupture of the support lugs over the service life.

Figure 4:
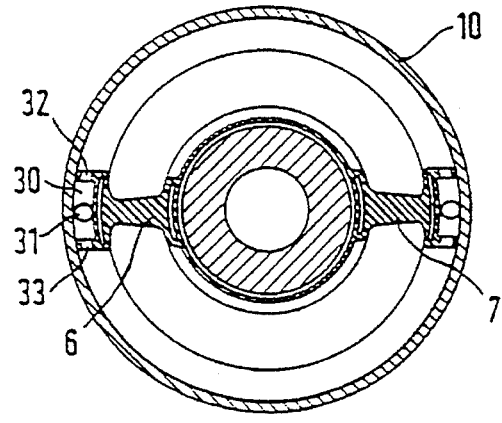
FIG. 4 is a cross-sectional view of a bearing bush with an additional damping channel.

Another problem is that particularly in Diesel engines an attempt is made to make the engine mount as soft as possible in the idling rpm range, in order to avoid transmission of vibration from engine jarring to the vehicle body and therefore to the passenger compartment. This is achieved with an embodiment as shown in the cross section of FIG. 4. In this case a separate overflow channel 30 with a short length is provided parallel to the overflow channel 19, in the region joining the support lugs 6 and 7 adjacent the outer tube 10.

A co-vibrating mass 31 with a spherical shape, for instance, can move relatively freely upward and downward in this separate channel 30. However, an inflow opening 32 and an outflow opening 33 must have a smaller diameter than the vibrating mass 31, to prevent it from slipping out of the channel 30. This co-vibrating mass causes an underswing of the course of stiffness at a desired frequency, but conversely does not influence or only very slightly influences the damping at high amplitudes, because this mass 31 has only a limited vibrational distance available. Once the mass 31 reaches the end of the channel 30 at the outlet or inlet openings 32 and 33, the mass 31 closes these openings, whereupon the fluid is then repumped through the actual overflow channel 19.

Figure 5:
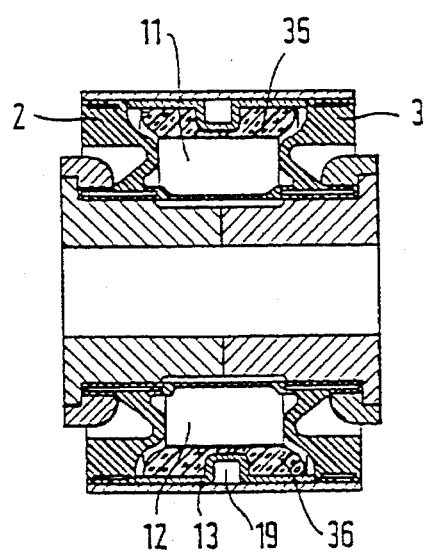
FIG. 5 is a longitudinal-sectional view of a bearing bush with an additional absorber.

A further option for compensation of thermal expansions that might possibly occur is shown in FIG. 5. In this case, a respective absorber 35 and 36, that is made of an elastomer with trapped gas bubbles, is disposed in the region between the two support springs 2 and 3, adjacent the sheath 13 for the overflow channel 19. Such an absorber is relatively readily compressible and can thus easily compensate for volumetric changes in the chambers 11 and 12 caused by thermal expansion.

The overall result is accordingly a bearing bush that can be produced in a simple way and in which, because of the intended modular construction, adaptation to the most varied conditions and requirements can be performed in a simple way. In particular, the bush or mount described above has a very soft behavior at small deflections, while at greater vibration amplitudes a rapid increase in stiffness occurs, through the suitable disposition of stops, so as to limit the deflections of the bush.

We claim:

1. A hydraulically damping bearing bush, comprising:
    a hollow-cylindrical bearing core having ends with end surfaces;

an outer tube having end surfaces;

two elastomeric support springs having a space therebetween, said support springs being disposed between said bearing core and said outer tube at said end surfaces, and said support springs extending substantially radially and having inwardly curved wall portions;

elastomeric radial support lugs extending horizontally on two sides between said bearing core and said outer tube, said support lugs dividing said space into upper and lower fluid-filled chambers;

an annular channel through which said chambers communicate with one another;

a cylindrical diaphragm-like elastomeric part extending between said two support springs along said bearing core;

radially extending, bead-like stop rings disposed on said ends of said bearing core in the vicinity of said inwardly curving wall portions; and an additional channel extending between said support lugs and said outer tube, said additional channel having the form of a segment of a circle and having a limited length, a given diameter and reduced inlet and outlet openings, and a spherical mass being enclosed in said additional channel and having a diameter being slightly smaller than said given diameter.

2. A hydraulically damping bearing bush, comprising:

a hollow-cylindrical bearing core having ends with end surfaces;

an outer tube having end surfaces;

two elastomeric support springs having a space therebetween, said support springs being disposed between said bearing core and said outer tube at said end surfaces, and said support springs extending substantially radially and having inwardly curved wall portions;

elastomeric radial support lugs extending horizontally on two sides between said bearing core and said outer tube, said support lugs dividing said space into upper and lower fluid-filled chambers;

an annular channel through which said chambers communicate with one another;

a cylindrical diaphragm-like elastomeric part extending between said two support springs along said bearing core;

radially extending, bead-like stop rings disposed on said ends of said bearing core in the vicinity of said inwardly curving wall portions; and an additional channel extending between said support lugs and said outer tube, said additional channel having the form of a segment of a circle and having a limited length, a given diameter and reduced inlet and outlet openings, and a cylindrical mass being enclosed in said additional channel and having a diameter being slightly smaller than said given diameter.

\* \* \* \* \*

UNITED STATES PATENT AND TRADEMARK OFFICE
CERTIFICATE OF CORRECTION

PATENT NO.  : 5,509,643
DATED       : April 23, 1996
INVENTOR(S) : Udo Carstens et al.

It is certified that error appears in the above-indentified patent and that said Letters Patent is hereby corrected as shown below:

On the title page:

Item (30) Foreign Application Priority Data should read as follows:

February 19, 1993    (DE)    Germany .........P4305173.1-12

Signed and Sealed this

Twenty-fifth Day of February, 1997

Attest:

BRUCE LEHMAN

*Attesting Officer*          *Commissioner of Patents and Trademarks*